(12) United States Patent
Lee et al.

(10) Patent No.: US 8,725,558 B1
(45) Date of Patent: May 13, 2014

(54) INTRA-SITE PRODUCT ADVERTISING SYSTEM

(75) Inventors: Han Lee, Issaquah, WA (US); Darren Sillett, Woodinville, WA (US)

(73) Assignee: Amazon Technologies, Inc., Reno, NV (US)

( * ) Notice: Subject to any disclaimer, the term of this patent is extended or adjusted under 35 U.S.C. 154(b) by 900 days.

(21) Appl. No.: 12/464,225

(22) Filed: May 12, 2009

(51) Int. Cl.
 *G06Q 30/00* (2012.01)
 *G06Q 90/00* (2006.01)
(52) U.S. Cl.
 CPC .................................... *G06Q 90/00* (2013.01)
 USPC ....................................................... 705/14.1
(58) Field of Classification Search
 CPC ...................................................... G06Q 90/00
 USPC ........................................................ 705/14.1
 See application file for complete search history.

(56) References Cited

U.S. PATENT DOCUMENTS

2009/0222345 A1 * 9/2009 Greene ........................... 705/14

* cited by examiner

*Primary Examiner* — Daniel Lastra
(74) *Attorney, Agent, or Firm* — Novak Druce Connolly Bove + Quigg LLP

(57) ABSTRACT

Systems and methods are provided for determining an electronic advertisement to be displayed to a highly targeted set of customers. Items are grouped into item groups of related and competing products and advertisers competitively bid against other advertisers having products in the same item group to determine whose advertisement will potentially be shown to customer associated with the item group.

31 Claims, 4 Drawing Sheets

INTRA-SITE PRODUCT ADVERTISING SYSTEM

BACKGROUND

As the number of users viewing information and purchasing items electronically increases, there is a corresponding increase in the amount of advertising revenue spent in electronic environments. In some cases, advertisements are targeted to specific users or to specific web pages or other interfaces to be displayed to users. Advertisements also may be selected based on the content displayed on any number different pages displayed to a user or may also be selected based on search information, such as keywords, entered into a search engine as a user searches for content. Advertisements displayed to a user may also be related to the search results.

Often, the advertisement includes a hypertext link or other user-selectable element that enables the user to navigate to another page or display relating to the advertisement. The page or display relating to the advertisement may provide the user with the ability to purchase the products or services offered by the advertiser either directly from the advertiser or from a provider of the site. Advertisers hope to generate sales by purchasing sponsored advertisements for display to users most likely to be interested in purchasing the products or services that the advertiser is offering.

A provider of a site, such as an ecommerce website, may offer for sale a number of similar, competing products or services, and the provider may receive offers from multiple advertisers who wish to place sponsored advertisements on the site. The provider of the site will want to maximize advertisement revenue by selecting advertisements for display that provide the highest revenue from the advertisers while also displaying advertisements interesting to users that, when selected by a user, lead the user to the related product or service being offered for sale by the site provider.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to selecting an advertisement for display and for determining a bid price for the advertisement in an electronic environment. As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, that enable a user to select or otherwise access the navigational element to be directed to a page or other location provided by the advertiser. The advertiser typically will pay a provider of the electronic interface based upon an aspect of each sponsored ad, such as the number of times users select the navigational element included therein or the number of times that an advertisement is displayed to users.

Systems and methods are provided to enable advertisers to competitively bid to have their advertisements displayed on a particular electronic interface, such as an ecommerce site, to a highly targeted audience. Advertisers as used in this disclosure might include manufacturers, distributors, licensees, or others have an interest in increasing the sales of a product or service through advertising. Advertisers benefit by reaching a highly targeted audience, and the advertisement content provider benefits by being paid an amount that reflects advertiser interest in reaching this targeted audience. Products or services to be advertised are grouped into item groups or "baskets" that include competing, related products or services, and each basket is associated with a target audience. The target audience includes a set of customers who are highly likely to purchase a product or service from the basket. Advertisers who wish to have advertisements for their items displayed to this target audience may bid to have their advertisement displayed. A winning bid is selected and an advertisement for the item associated with the winning bid may then be displayed to customers who fall within the targeted audience associated with the basket.

In some embodiments, the highest bidder wins and that advertiser's ads will be displayed. However, in some embodiments, alternative methods for selecting a winning bidder might be implemented. For example, a bid from a first advertiser who has bid on multiple baskets may be selected over a bid from a second advertiser who only bid on a single basket, even if the bid from the second advertiser was not greater than the bid received from the second advertiser.

Figure 1:
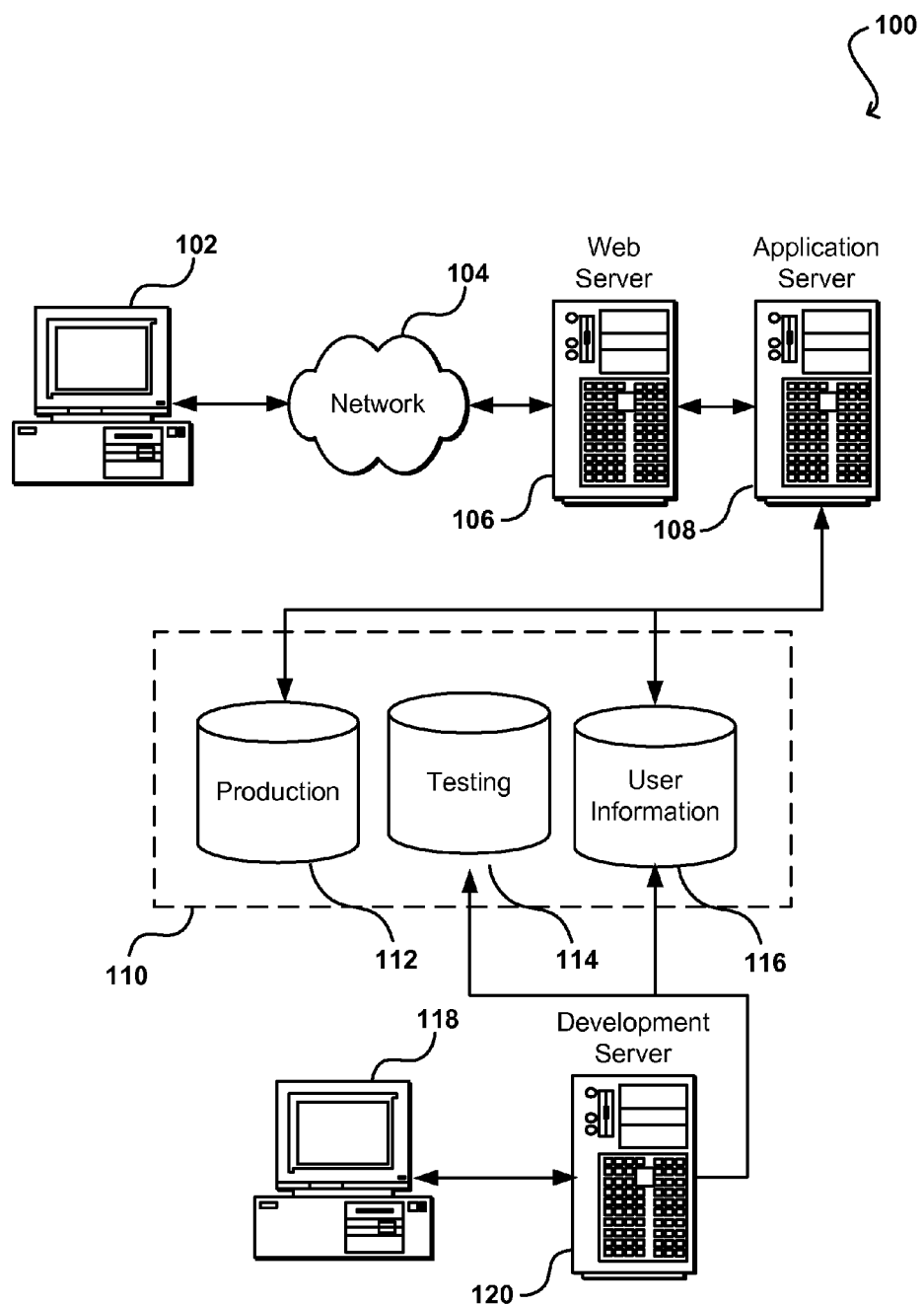
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
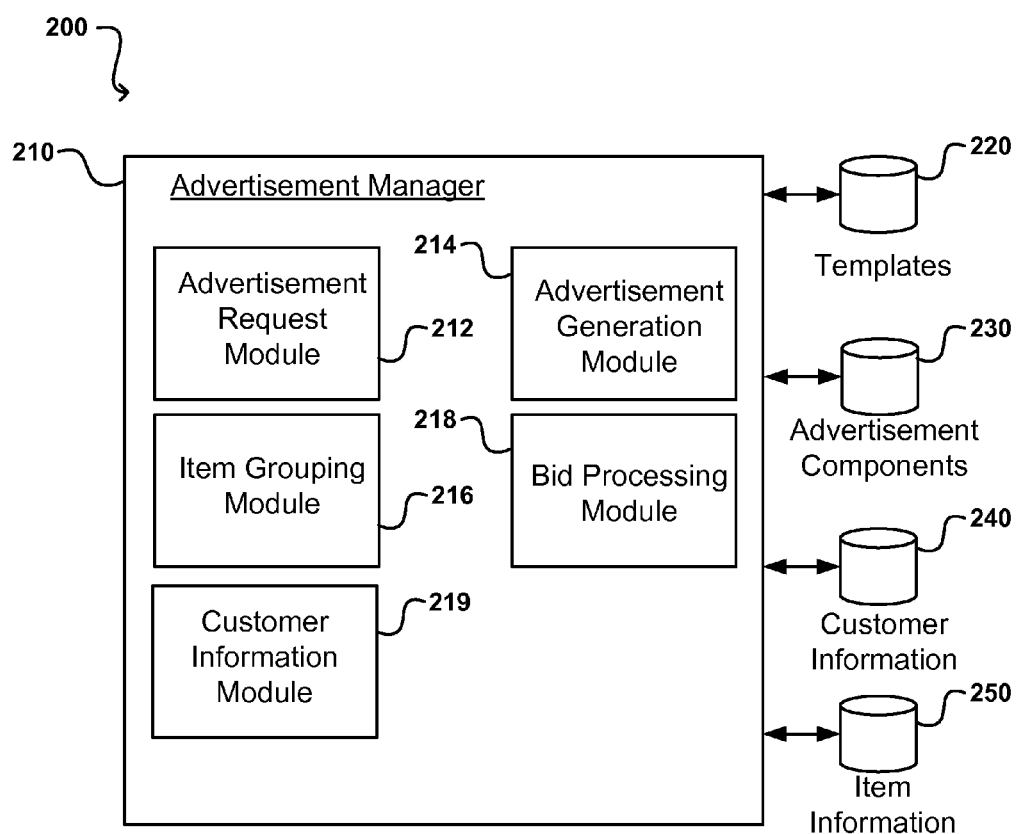
FIG. 2 illustrates components for managing advertisement content related to items and for processing bids to display advertisements that can be used in accordance with one embodiment.

An environment such as that illustrated in FIG. 1 can be useful for an electronic advertisement content provider that provides electronic advertisements to consumers of electronic advertisements, such as web sites, wherein multiple hosts might be used to perform tasks such as serving content, authenticating users, performing payment transactions, or performing any of a number of other such tasks. Some of these hosts may be configured to offer the same functionality, while other servers might be configured to perform at least some different functions. The electronic environment in such cases might include additional components and/or other arrangements, such as those illustrated in the configuration 200 of FIG. 2. In this example, an advertisement content manager 210 responds to requests for electronic advertisements, manages bidding competitions for item groups, and generates advertisement content. Advertisement content manager 210 includes advertising request module 212, advertisement generation module 214, item grouping module 216, and bid processing module 218. Advertisement content manager 210 reads and/or writes data to templates data store 220, advertisement components data store 230, customer information data store 240, and item information data store 250. Data stores 220, 230, 240, and 250 may, in some embodiments, be implemented on the same server as advertisement content manager 210, while in other embodiments, data stores 220, 230, 240, and 250 are implemented as separate from advertisement content manager 210 on either same server or a different server as advertisement content manager 210.

In an embodiment, advertisement content manager 210 may be provided by an ecommerce site provider to manage advertisements to be displayed on an ecommerce site also operated by the ecommerce site provider. In an embodiment, advertisement content manager 210 may be provided by an advertisement content provider that provides advertisements for ecommerce sites operated by third parties, and these third parties contract with the advertisement provider to provide electronic advertisements for the third parties' ecommerce sites. The advertisement content manager 210 may include an interface for identifying users across multiple ecommerce sites and may track user preferences, purchasing history, and browsing history across these sites. In one embodiment, HTTP cookies may be used for tracking and identification purposes across multiple sites.

In embodiments where the advertisement provider provides advertisements to an ecommerce site operated by a third party, the advertisement provider may enter into a profit sharing agreement with the third party operator of the ecommerce site as an added incentive for the third party operator to use the services of the advertisement provider. As described above, an advertiser typically pays an electronic advertisement provider based upon an aspect of each sponsored ad, such as the number of times users select the navigational element included therein or the number of times that an advertisement is displayed to users. The advertisement provider may share a portion of the payment received from advertisers with the third party operator as an incentive for the third party operator to use the advertisement provider's services.

Advertising request module 212 processes requests received by advertisement content manager 210 for electronic advertisements. As indicated above, the requests for advertisements may originate from an ecommerce site also operated by the advertisement content provider for from an ecommerce site operated by a third party. Advertisement request module 212 may select existing advertisements from advertisement components data store 230 or may request that a new electronic advertisement be generated by advertisement generation module 214.

Advertisement generation module 214 may be used to generate a new advertisement using advertisement components from advertisement components data store 230. The components may include images, video content, text, and animated content and/or a combination thereof. The advertising components may be provided by an advertiser of the item being advertised or may be generated from stock or "house" content generated by the advertisement provider.

Item information data store 250 stores information associated with each item to be advertised. Each item is assigned a unique identifier and is associated with one or more advertising components that may be used by advertisement generation module 214 to create an electronic advertisement. Advertisement generation module 214 may use predefined templates from templates data store 220 to create electronic advertisements with advertisement components from advertisement components data store 230.

Item grouping module 216 provides an interface that enables a user to create item groupings or "baskets" of competing, related products and/or services and to associate target audience information with the basket. Competing, related products and/or services may include products that perform similar functions or include similar features or services that provide similar benefits. Competing, related items may also include items where a person likely to purchase one item over another and is not likely to purchase both items. Advertisers of the items included a basket have an incentive to bid for advertisements for their items in order to gain a competitive advantage for their items by advertising them to a highly targeted audience.

For example, a basket might be created for digital camera's having greater than 10 megapixels. This example illustrates a basket includes items that are both related and competing items. The digital cameras include at least one similar feature: a resolution greater than 10 megapixels. Also, a person is not likely to purchase more than one camera.

An item may also be included in more than one basket with different competing items in each basket. For example, a laptop computer might be included in a multimedia computer basket, a gaming computer basket, and a portable computer basket, with each basket including a different set of competing computer products.

Item grouping module 216 may provide a graphical user interface that enables a user to select related items to create new "baskets" that may be offered for bidding and for associating a target audience with the basket. In an embodiment, item grouping module 216 may also provide functionality for identify related items based on the purchasing and/or browsing patterns of users. For example, aggregate user browsing history and sales data may indicate that buyers of certain types of items browse certain other competing items before making a purchase. A basket may be created that includes these competing items based on the aggregate browsing history and sales data. In an embodiment, item grouping information may be stored in item information data store 250.

Bid processing module 218 provides an interface for receiving bids from advertisers or other external entities for advertisements on items included in a basket. In an embodiment, bid processing module 218 provides a user interface that enables advertisers to view baskets for which the bidding process is still open and to place bids on the advertisements. In an embodiment, access to the bidding interface may be limited only to those advertisers whose items are included in a particular basket. In another embodiment, only the current high bid price may be shown to advertisers and the bid history, including who placed bids on a particular basket and the amount of those bids, may be hidden from the advertisers.

Figure 3:
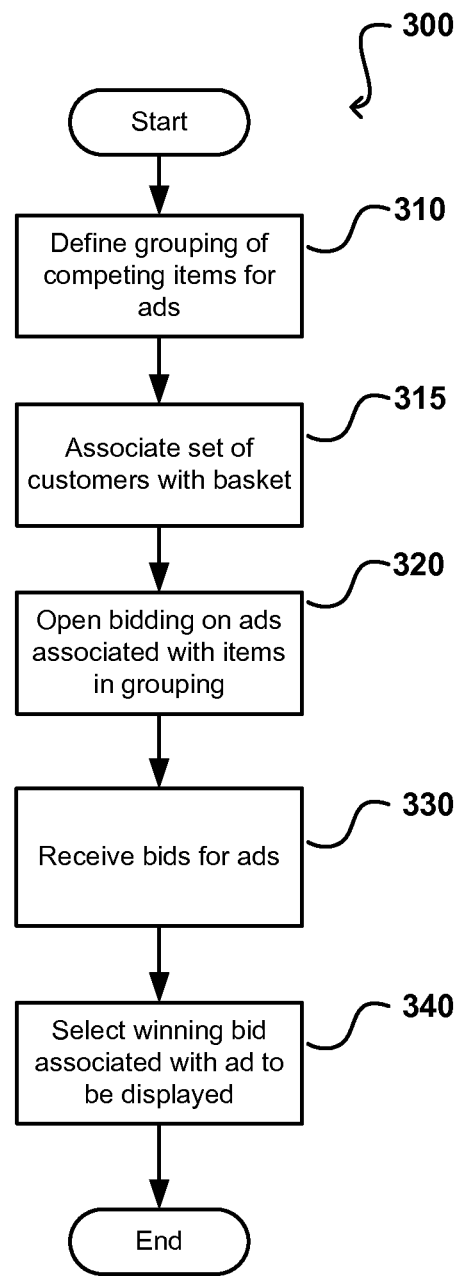
FIG. 3 illustrates steps of a process for bidding on electronic advertisements in accordance with one embodiment.

FIG. 3 illustrates steps of a process 300 for bidding on electronic advertisements in accordance with one embodiment. In process 300, a grouping or basket of related, competing items is defined 310. The items selected for inclusion in the basket are items for sale by an ecommerce site on which the advertisements are to be displayed. If a user activates a navigation element of the advertisement for the winning item, a "landing page" for that item will be displayed to the user that clicked the advertisement. The landing page provides the user with the ability to purchase the item from the ecommerce site.

As described above, the items to be included in a basket may be manually selected by an administrator who can identify related items from the items being offered for sale by the ecommerce site. In an embodiment, related, competing items may also be selected for inclusion in a basket based on aggregate sales and/or browsing statistics data collected from the ecommerce website and/or other sources. For example, executable scripts and/or programs may be used to execute queries on aggregate sales and/or browsing statistics to identify competing, related items and to create baskets for bidding on advertisements related to the items included in the basket.

According to one embodiment, a basket may be created for portable electronic music players offered for sale by an ecommerce site where the advertisements from the basket may be displayed when a customer from the target audience visits the ecommerce site. The ecommerce site in this illustrative embodiment offers for sale several competing electronic music players: the Apple iPod Touch, the Microsoft Zune, the Creative Zen, and the SanDisk Sansa music players. Advertisers for each these items included in the basket will be provided an opportunity to competitively bid to have an advertisement for their item displayed to customers from the target audience.

In an embodiment, once items have been selected for inclusion in a basket, an item information data store may be updated to indicate which items are included in the basket. In some embodiments, the advertisement provider may provide advertisements to an ecommerce site operated by a third party, and the item information in the item information data store may need to be updated periodically as new items are offered for sale by the ecommerce site, items are no longer offered by the ecommerce site, or items sell out.

Once a basket has been defined, a set of potential customers most likely to purchase an item in the basket is identified and associated with the basket 315. By selecting those customers most likely to purchase an item in the basket, an advertiser is provided with a highly targeted audience for the advertisements. In an embodiment, the identification of customers to associate with the basket may be manually performed by an operator and/or an automated process. Where selection of customers is an automated process, a specific customer may be associated with the basket based upon browsing and/or purchase statistics of the customer.

For instance, referring once again to the electronic music player example described above, the targeted audience associated with the electronic music player basket may comprise customers have an interest in music. For example, the targeted audience may include customers who have recently conducted music-related searches or have browsed content related to music and/or electronic music players. The targeted audience may also include customers who have recently made music-related purchases, such as customers who have recently purchased MP3 audio files or other audio content. According to an embodiment, user browsing and purchasing statistics may be stored in a customer information data store and used to determine which customers to target. According to other embodiments, user browsing and purchasing statistics also may be maintained by an ecommerce site or sites maintained by third parties and data related to customer browsing and purchasing may be periodically provided to an advertisement content manager via a customer information module. In an embodiment, the customer information module provides an interface for receiving customer information and storing the information in the customer information data store.

Once the basket has been associated with a group of customers, bidding is opened for advertisements for items in the basket 315. Advertisers competitively bid to have an advertisement associated with their item to be shown to customers from the target audience associated with the basket. As described above, each item in an item information data store is assigned a unique serial number. Advertisers may bid on an item in the basket using the unique serial number of the item. In an embodiment, an advertiser may have multiple items in a basket and place bids for one or more of these items either separately or collectively.

Advertisers may place bids for a specific item once bidding has been opened for the basket 320. In one embodiment, the bids are received by a bid processing module. In some implementations, a bid processing module may automatically notify advertisers associated with each item included in a basket that one of the advertiser's items has been included in a new basket and the terms of the bidding process, such as a starting bid and the time that bidding will open and close. According to some embodiments, the bid processing module may provide a graphical user interface, such as a web page, where an advertiser may manage bids associated with the advertiser's items. For example, an advertiser may be able to view baskets associated with the advertiser's items, to place bids for advertisements, and to view whether the advertiser bid is winning. In an embodiment, a blind bidding process may be used where an advertiser can only view the bid amounts that have been placed by competing bidders, but who placed the bids and for which item is hidden.

A winning bid is selected from the bids received for the basket 330. The winning bid may be selected using various criteria. In some implementations, the winning bid is merely the highest bid for the baskets. Various methods for determining when a bidding on a basket may be used. For example, a specific end date and time may be specified and a winning bid selected when the end date and time is reached. In some embodiments, advertisers may increase their bid amounts until bidding is closed. An advertisement associated with the winning bid may then be presented to customers when a customer that fall within the group of customers associated with the basket is presented with an advertisement.

Figure 4:
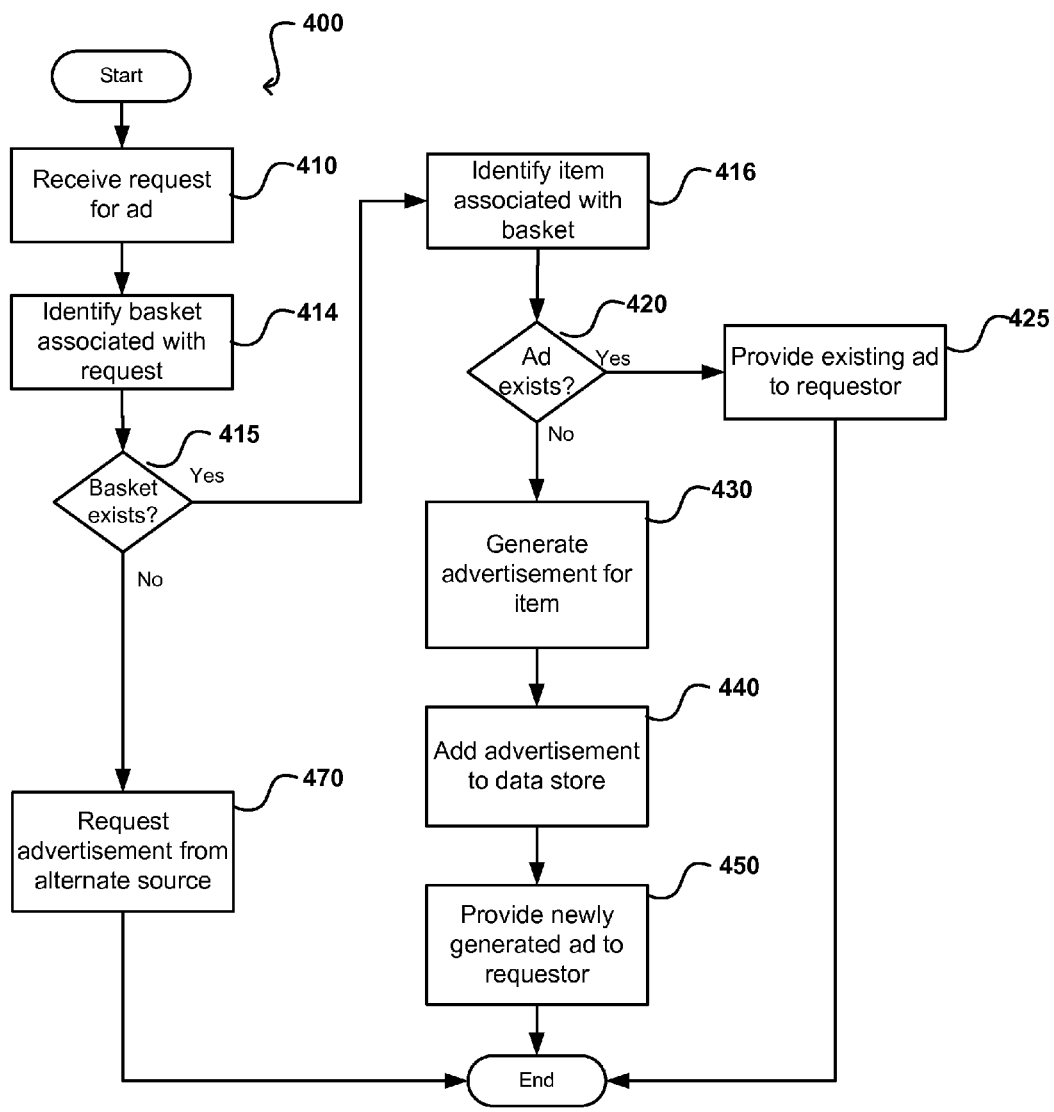
FIG. 4 illustrates steps of a process for processing a request for an electronic advertisement in accordance with one embodiment.

According to an embodiment, the winning bid for a basket determined by selecting the bid of the highest bidder. In another embodiment, the winning may be selected using other criteria, such as the whether the bidder has placed bids on advertisements for advertisements in other baskets. In an embodiment, a bid processing module may track one or more alternate bid winners in event that the winning bidder fails to pay the winning bid price. In an embodiment, the bid processing module may maintain a record of the bids of each of the bidders, and in the event that an item associated with the winning bid becomes unavailable after bidding has been closed, an alternative winning bidder could be selected from other FIG. 4 illustrates steps of a process 400 for processing a request for an electronic advertisement in accordance with one embodiment. A request for an electronic advertisement is received 410. Often an advertisement request originates from a customer that has loaded a web page into a browser application. The web page may include one more embedded advertisements. In some instances, the publisher may be the source of the advertisement content, and the advertisement content is provided by one of the publisher's servers, which may be the same web server or servers from which the web page content is provided or the advertisement content may originate from a separate ad server. Some publishers utilize third party advertisement content providers to provide content to their sites, and a customer viewing the web page with the embedded advertisements receives the advertisement content from the third-party provider's ad server.

Once the request has been received, a basket associated with the request is identified 414. The request for the advertisement may include information about the content of the page in which the advertisement is to be displayed and/or information about a user to which the advertisement is to be targeted. A basket having items related to the content and/or user's preferences is selected from an item information data store. According to an embodiment, an advertisement request module receives and parses the request for the advertisement and identifies a basket associated with the request.

In an embodiment, the basket is selected by first identifying a target audience for the requested advertisement and then selecting a basket with an associated target audience having attributes similar to those of the target audience for the requested advertisement. The target audience for the advertisement may be identified based on information included in the request for the advertisement, the source of the request, and/or customer-related information for a customer for which the advertisement is to be displayed. In some embodiments, the request for the advertisement may include information to identify a specific customer for the advertisement, such as a login id or screen name that provides a unique identifier for the customer. In an embodiment, the customer identifier may be used to access a customer information data store to access customer preferences to use in identifying a basket or baskets having an associated target audience into which the customer is included.

In the event that multiple baskets are identified, a basket having a target audience with attributes most similar to the attributes of the customer for which the advertisement is to be displayed. Various methods known to the art may be employed for identifying a basket having a target audience with attributes most similar to those of the customer. For example, each attribute used to identify the target audience may be assigned a weighted value and a basket having a highest matching score may be selected.

According to an embodiment, if multiple baskets have target audiences with attributes similar to the attributes of the customer for which the advertisement is to be displayed, the baskets may be prioritized according to various criteria in an attempt to maximize the revenue that may be generated by the advertisement. In an embodiment, the baskets may be prioritized according to the profit margin of the item to be advertised, and the basket having the highest profit margin may be selected. In an embodiment, the price of the item to be advertised may be used to prioritize the baskets. For example, a basket having an item having the highest price may be selected, or alternatively, an item having a lowest price may be selected if, based on the customer's purchase history, the user is more likely to purchase a less expensive item. In an embodiment, the baskets may be prioritized according to the likelihood that the customer would purchase that item being advertised. The likelihood that the customer may purchase an item may be determined using the customer's purchase history.

A determination is made whether any baskets were identified 415. If no baskets were identified that have attributes similar to the customer, an advertisement may be requested from an alternate source 470. For example, an advertisement may be requested from a conventional electronic advertising service for display to the user. In an embodiment, the alternate source for the electronic advertisement may be part of the electronic advertisement system. For example, the advertisement manager may access an alternate advertisements data store. In an embodiment, the alternate source for the electronic advertisement may be a third party electronic advertisement provider.

If a basket was identified, an item to be advertised is selected 416. The item to be advertised is the item associated with the winning bid from a competitive bidding process, such as the process of FIG. 3 described above.

Once the item to be advertised has been identified, a determination whether an advertisement already exists for the item 420. According to an embodiment, an advertisement request module may access an advertisements components data store to determine whether an advertisement already exists for the item. In some cases, an advertiser may have provided advertisement content for an item or an advertisement may have been generated from existing advertisement components and stored in advertisement components data store. If an existing advertisement is available, the existing advertisement is provided to the requestor 425.

Otherwise, if no advertisement exists, an advertisement is generated for the item 430 using advertisement components stored in an advertisement components data store. The advertisement components data store may include images, videos, text, and/or other content that may be used either alone or in conjunction with other content to create an advertisement for an item. For example, if an advertisement for a digital music player is required, a stock photo of the item may be available in an advertisement components data store. Custom text may then be generated an overlaid over the stock photo to create an advertisement for the item. According to some embodiments, templates may be used to generate advertisement from stock components from an advertisement data store. For example, an advertisement generation module may select a template from a template data store and use the template to assemble an advertisement from advertisement components from an advertisement components data store.

After generating the advertisement, the advertisement may be added to advertisement data store 440 so that advertisement may be used for subsequent requests for an advertisement for the item. The newly generated advertisement is then provided to the requestor 450.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining an electronic advertisement to be displayed, the method comprising:

under control of one or more computer systems configured with executable instructions, defining an item grouping for a plurality of related items;

associating the item grouping with a target audience that comprises one or more users likely to purchase an item from the plurality of related items in the item grouping;

receiving bids to display to the target audience an electronic advertisement associated with an item from the item grouping;

evaluating the bids received according to criteria including at least a bid price and a quantity of bids previously received from a given advertiser;

selecting a winning bid from amongst the evaluated bids;

determining whether a pre-existing advertisement exists for the item associated with the winning bid and, if no pre-existing advertisement exists, generating an advertisement for the item using components stored in an advertisement components store;

designating the pre-existing advertisement for provision to a content provider when the pre-existing advertisement exists and designating the generated advertisement when the generated advertisement is generated;

from a content provider, receiving a request for an electronic advertisement for display to a user, the request identifying the user associated with the request;

determining whether the request is related to the item grouping based on a purchase history of the user; and providing, to the content provider, the designated advertisement for display when the request is related to the item grouping.

2. The method of claim 1, wherein defining the item grouping comprises:

selecting items to include in the item grouping, wherein the items are items that are offered for sale by a seller whose website is to display the electronic advertisement, the items being competing, related items.

3. The method of claim 1, wherein the plurality of related items includes at least one of a plurality of related products and a plurality of related services.

4. A computer-implemented method for determining an electronic advertisement to be displayed, the method comprising:

under control of one or more computer systems configured with executable instructions, defining an item grouping for a plurality of related items;

defining a target audience for the item grouping;

receiving bids to display to the target audience an electronic advertisement associated with an item from the item grouping;

selecting a winning bid based on the bids received; and determining whether a pre-existing advertisement exists for the item associated with the winning bid and, if no pre-existing advertisement exists, generating an advertisement for the item using components stored in an advertisement components store;

designating the pre-existing advertisement for provision to a content provider when the pre-existing advertisement exists and designating the generated advertisement when the generated advertisement is generated;

displaying the designated advertisement to at least one member of the target audience when a request to display an electronic advertisement is received, the request being a request for an advertisement related to the plurality of related items.

5. The method of claim 4, wherein defining the item grouping comprises:
selecting items to include in the item grouping, wherein the items are items that are offered for sale by a seller whose website is to display the electronic advertisement.

6. The method of claim 4, wherein defining the item grouping comprises:
selecting items to include in the item grouping, wherein the items are items that are offered for sale by a third party seller whose website is to display the electronic advertisement.

7. The method of claim 6, wherein profits from displaying the advertisement are shared with the third-party seller.

8. The method of claim 4 further comprising:
receiving a request for an electronic advertisement from a content provider;
determining whether the request is related to the item grouping; and
if the request is related to the item grouping, providing the electronic advertisement designated for display to the content provider.

9. The method of claim 8, wherein determining whether the request is related to the item grouping comprises:
identifying a user associated with the request; and
determining whether the user may be interested in items in the item grouping based on user profile information of the user.

10. The method of claim 8, wherein determining whether the request is related to the item grouping comprises:
determining whether content to be displayed to a user and associated with the request is related to the item grouping.

11. The method of claim 4, wherein the plurality of related items includes a plurality of related services.

12. The method of claim 4, wherein the plurality of related items includes a plurality of related products.

13. The method of claim 4, wherein the plurality of related items includes a plurality of related products and services.

14. A system for bidding on advertisements to be displayed in an electronic environment, comprising:
a processor; and
a memory device including instructions that, when executed by the processor, cause the processor to:
define an item grouping for a plurality of related items;
define a target audience for the item grouping;
receive bids to display to the target audience an electronic advertisement associated with an item from the item grouping;
select a winning bid based on the bids received;
determine whether a pre-existing advertisement exists for the item associated with the winning bid and, if no pre-existing advertisement exists, generate an advertisement for the item associated with the winning bid using components stored in an advertisement components store;
designate the pre-existing advertisement for display when the pre-existing advertisement exists and designate the generated advertisement for display when the generated advertisement is generated; and
display the designated advertisement to the target audience when a request to display an electronic advertisement is received, the request being a request for an advertisement related to the plurality of related items for display to the target audience.

15. The system of claim 14, wherein the instructions that cause the processor to define the item grouping comprises instructions to cause the processor to:
select items to include in the item grouping, wherein the items are items that are offered for sale by a seller whose website is to display the electronic advertisement.

16. The system of claim 14, wherein the instructions that cause the processor to define the item grouping comprises instructions to cause the processor to:
select items to include in the item grouping, wherein the items are items that are offered for sale by a third party seller whose website is to display the electronic advertisement.

17. The system of claim 16, wherein profits from displaying the advertisement are shared with the third-party seller.

18. The system of claim 14, wherein the memory device further includes instructions that cause the processor to:
receive a request for an electronic advertisement from a content provider;
determine whether the request is related to the item grouping; and
if the request is related to the item grouping, provide the electronic advertisement designated for display to the content provider.

19. The system of claim 18, wherein the instructions that cause the processor to determine whether the request is related to the item grouping further comprises instructions to cause the processor to:
identify a user associated with the request; and
determine whether the user may be interested in items in the item grouping based on a purchase history of the user.

20. The system of claim 18, wherein the instructions that cause the processor to determine whether the request is related to the item grouping further comprises instructions to cause the processor to:
determine whether content to be displayed to a user and associated with the request is related to the item grouping.

21. The system of claim 14, wherein the plurality of related items includes a plurality of related services.

22. The system of claim 14, wherein the plurality of related items includes a plurality of related products.

23. The system of claim 14, wherein the plurality of related items includes a plurality of related products and services.

24. A computer program product embedded in a non-transitory computer-readable medium and including instructions that, when executed by at least one computing device, cause the at least one computing device to:
define an item grouping for a plurality of related items;
define a target audience for the item grouping;
receive bids to display an electronic advertisement associated with an item from the item grouping to the target audience;
select a winning bid based on the bids received;
determine whether a pre-existing advertisement exists for the item associated with the winning bid and, if no pre-existing advertisement exists, generate an advertisement for the item associated with the winning bid using components stored in an advertisement components store;
designate the pre-existing advertisement for display when the pre-existing advertisement exists and designate the generated advertisement for display when the generated advertisement is generated; and
display the designated advertisement when a request to display an electronic advertisement to at least one member of the target audience is received, the request being a request for an advertisement related to the plurality of related items.

25. The computer program product of claim 24, further comprising instructions that, when executed, cause the at least one computing device to:

select items to include in the item grouping, wherein the items are items that are offered for sale by a seller whose website is to display the electronic advertisement.

26. The computer program product of claim 24, wherein the instructions that cause the processor to define the item grouping comprises instructions to cause the processor to:

select items to include in the item grouping, wherein the items are items that are offered for sale by a third party seller whose website is to display the electronic advertisement.

27. The computer program product of claim 26, wherein profits from displaying the advertisement are shared with the third-party seller.

28. The computer program product of claim 24, further comprising instructions that, when executed, cause the at least one computing device to:

receive a request for an electronic advertisement from a content provider;

determine whether the request is related to the item grouping; and provide the electronic advertisement designated for display to the content provider if the request is related to the item grouping.

29. The computer program product of claim 28, wherein the instructions that cause the at least one computing device to determine whether the request is related to the item grouping comprise instructions that cause the at least one computing device to:

identify a user associated with the request; and determine whether the user may be interested in items in the item grouping based on user profile information of the user.

30. The computer program product of claim 28, wherein the instructions that cause the at least one computing device to determine whether the request is related to the item grouping comprise instructions that cause the at least one computing device to:

determine whether content to be displayed to a user and associated with the request is related to the item grouping.

31. The computer program product of claim 24, wherein the plurality of related items includes at least one of a plurality of related products and a plurality of related services.

* * * * *